(12) United States Patent
Sato (10) Patent No.: US 11,959,544 B2
(45) Date of Patent: Apr. 16, 2024

(54) SHIFT DEVICE

(71) Applicant: ALPS ALPINE CO., LTD., Tokyo (JP)

(72) Inventor: Keisuke Sato, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 54 days.

(21) Appl. No.: 17/937,481

(22) Filed: Oct. 3, 2022

(65) Prior Publication Data

US 2023/0023240 A1    Jan. 26, 2023

Related U.S. Application Data

(63) Continuation of application No. PCT/JP2021/015096, filed on Apr. 9, 2021.

(30) Foreign Application Priority Data

Apr. 15, 2020    (JP) ................. 2020-072960

(51) Int. Cl.
*F16H 59/10*    (2006.01)
*F16H 59/02*    (2006.01)

(52) U.S. Cl.
CPC ......... *F16H 59/10* (2013.01); *F16H 59/0278* (2013.01)

(58) Field of Classification Search
CPC .............................. F16H 59/10; F16H 59/0278
See application file for complete search history.

(56) References Cited

U.S. PATENT DOCUMENTS 3,287,991 A * 11/1966 Eckert ................... F16H 59/044
74/533

FOREIGN PATENT DOCUMENTS

| JP | S63-135417 U | 9/1988 |
| JP | H02-140065 U | 11/1990 |
| JP | 2014-201185 | 10/2014 |
| WO | 2019/181023 | 9/2019 |

OTHER PUBLICATIONS

International Search Report for PCT/JP2021/015096 dated Jun. 22, 2021.

* cited by examiner

*Primary Examiner* — Terence Boes
(74) *Attorney, Agent, or Firm* — IPUSA, PLLC (57) ABSTRACT

A shift device according to one embodiment includes a case having a cylindrical portion; a shift lever configured to include a base portion provided to be rotatable inside the cylindrical portion, with which an operator performs a rotation operation; a shift position holding mechanism configured to hold the shift lever at a predetermined shift position; and an elastic member configured to protrude from one of the cylindrical portion or the base portion so as to face another of the cylindrical portion or the base portion, and contact either an outer circumferential surface of the base portion or an inner circumferential surface of the cylindrical portion, to impose a rotational load on the shift lever.

5 Claims, 7 Drawing Sheets

SHIFT DEVICE

CROSS-REFERENCE TO RELATED APPLICATIONS

This U.S. non-provisional application is a continuation application of and claims the benefit of priority under 35 U.S.C. § 365(c) from PCT International Application PCT/JP2021/015096 filed on Apr. 9, 2021, which is designated the U.S., and is based upon and claims priority to Japanese Patent Application No. 2020-072960 filed on Apr. 15, 2020, the entire contents of which are incorporated herein by reference.

BACKGROUND OF THE INVENTION

1. Field of the Invention

The present disclosure relates to a shift device.

2. Description of the Related Art

WO 2019/181023 (Patent document 1) discloses a shift device provided with a shift lever that is rotatably installed inside a case, and can be held at each of multiple shift positions when being rotated by an operator.

However, in the shift device described in Patent Document 1, the rotational load on the shift lever is relatively small; therefore, there is a likelihood that if being rotated vigorously, the shift lever may override a shift position where the shift lever should be held, and enters the next shift position.

SUMMARY OF THE INVENTION

According to one aspect in the present disclosure, a shift device includes a case having a cylindrical portion; a shift lever configured to include a base portion provided to be rotatable inside the cylindrical portion, with which an operator performs a rotation operation; a shift position holding mechanism configured to hold the shift lever at a predetermined shift position; and an elastic member configured to protrude from one of the cylindrical portion or the base portion so as to face another of the cylindrical portion or the base portion, and contact either an outer circumferential surface of the base portion or an inner circumferential surface of the cylindrical portion, to impose a rotational load on the shift lever.

DESCRIPTION OF THE PREFERRED EMBODIMENTS

In the following, with reference to the drawings, one embodiment will be described.

According to one embodiment, the rotational load on the shift lever can be imposed appropriately so as to prevent the shift lever from being rotated vigorously.

(Overview of the Shift Device 100)

Figure 1:
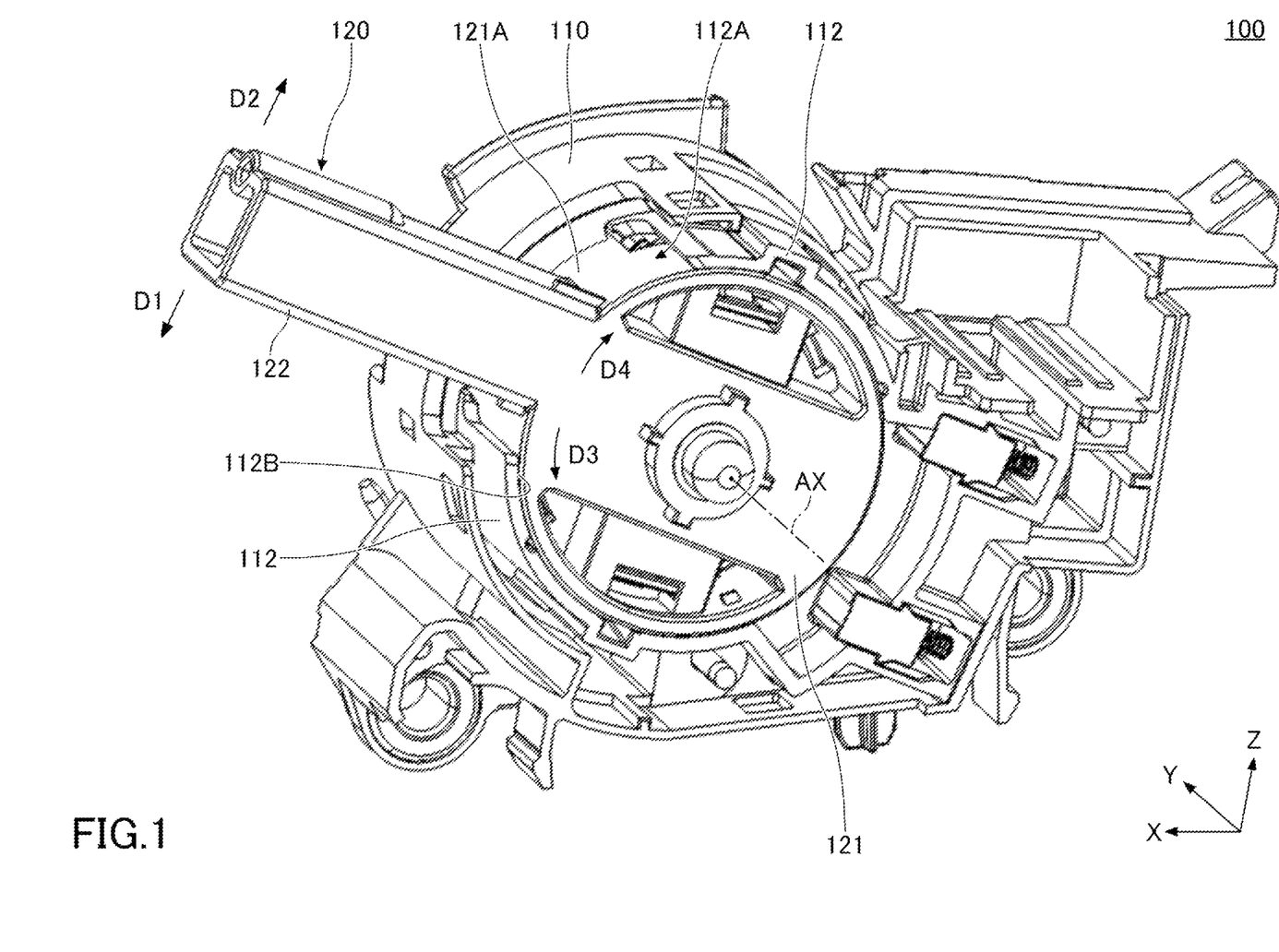
FIG. 1 is an external perspective view of a shift device according to one embodiment.

FIG. 1 is an external perspective view of a shift device 100 according to one embodiment. Note that in the following descriptions, for the sake of convenience, a direction corresponding to the height direction of a vehicle on which the shift device 100 is installed (Z-axis direction) is defined as the up-down direction, a direction corresponding to the length direction of the vehicle (X-axis direction) is defined as the front-back direction, and a direction corresponding to the width of the vehicle (Y-axis direction) is defined as the left-right direction.

The shift device 100 illustrated in FIG. 1 is installed on a vehicle such as an automobile at a position where it can be operated by the driver of the vehicle (for example, at the center console, etc.). The shift device 100 is operated by the driver (an operator) of the vehicle to shift gears of the vehicle. The shift device 100 is not a device to mechanically control the gears of the vehicle, but adopts a what-is-called shift-by-wire system to electrically control the gears of the vehicle by outputting a control signal corresponding to a shift operation to the outside.

Note that the shift device 100 may be used for purposes other than shifting gears of a vehicle, and may be used for equipment other than a vehicle (e. g., airplanes, railroad cars, game consoles, remote controls, etc.). Also, although the shift device 100 actually has an electrical configuration for outputting an electric signal in response to a shift operation, illustration and description of such an electrical configuration are omitted in the present embodiment.

As illustrated in FIG. 1, the shift device 100 includes a case 110 and a shift lever 120.

The case 110 serves as the basic skeleton of the shift device 100, and is a member to support the other components (such as the shift lever 120) provided in the shift device 100. The case 110 is formed by, for example, injection molding using various resin materials such as PBT (Polybutylene Terephthalate).

As illustrated in FIG. 1, the case 110 is provided with a cylindrical portion 112 (an example of one of the cylindrical portion or the base portion). The cylindrical portion 112 is a portion that has a generally cylindrical shape, and rotatably houses the base portion 121 of the shift lever 120 (an example of "another of the cylindrical portion or the base portion"). The inner diameter of the cylindrical portion 112 is slightly greater than the outer diameter of the base portion 121 of the shift lever 120.

The shift lever 120 is a member with which the driver of the vehicle performs a shift operation. The shift lever 120 is provided to be rotatable with respect to the case 110, with the center of rotation being the rotation center axis AX extending in the lateral (Y-axis) direction. For example, the shift lever 120 is made of either diecasting using various metal materials (aluminum, zinc, etc.) or by injection molding of the various resin materials described above.

The shift lever 120 is formed to have a base portion 121 and a lever portion 122. The base portion 121 is a portion that has a generally cylindrical shape. The base portion 121 is housed in the cylindrical portion 112 of the case 110, and can be rotated in the cylindrical portion 112 in the forward direction (a direction indicated by an arrow D3 in the figure) and in the backward direction (a direction indicated by an arrow D4 in the figure) with the center of rotation being the rotation center axis AX. The lever portion 122 is a columnar portion extending linearly forward (positive X-axis direction) and upward (positive Z-axis direction) from the outer circumferential surface of the base portion 121. The lever portion 122 can be rotated while the base portion 121 is being rotated by a rotation operation (shift operation) performed by the driver. Note that although a shift knob is attached to the tip of the lever portion 122, illustration of the shift knob is omitted in the present embodiment.

The driver of the vehicle can perform a rotation operation of the lever portion 122 of the shift lever 120 in a first operating direction (a direction indicated by an arrow D1 in the figure) that is downward (Z-axis negative direction) and in a second operating direction (a direction indicated by an arrow D2 in the figure) that is upward (Z-axis positive direction).

Predetermined shift patterns of gears of the vehicle correspond to multiple shift positions that are arranged in a predetermined order in a logically front-back direction. For example, in the present embodiment, the predetermined shift patterns include four shift positions including R (reverse), N (neutral), A (automatic), and M (manual), but are not limited as such.

The driver of the vehicle can switch the shift position of the vehicle among the multiple shift positions according to the predetermined shift patterns, by performing a rotation operation of the lever portion 122 in the first operating direction or in the second operating direction.

For example, the driver of the vehicle can switch the shift position of the vehicle to a shift position in the first operating direction, by rotating the lever portion 122 in the first operating direction, to rotate the base portion 121 in the forward direction (the direction indicated by the arrow D3 in the figure) by a predetermined angle.

Also, for example, the driver of the vehicle can switch the shift position of the vehicle to a shift position in the second operating direction by rotating the lever portion 122 in the second operating direction, to rotate the base portion 121 in the backward direction (the direction indicated by the arrow D4 in the figure) by a predetermined angle.

(Configuration of the Shift Device 100)

Figure 2:
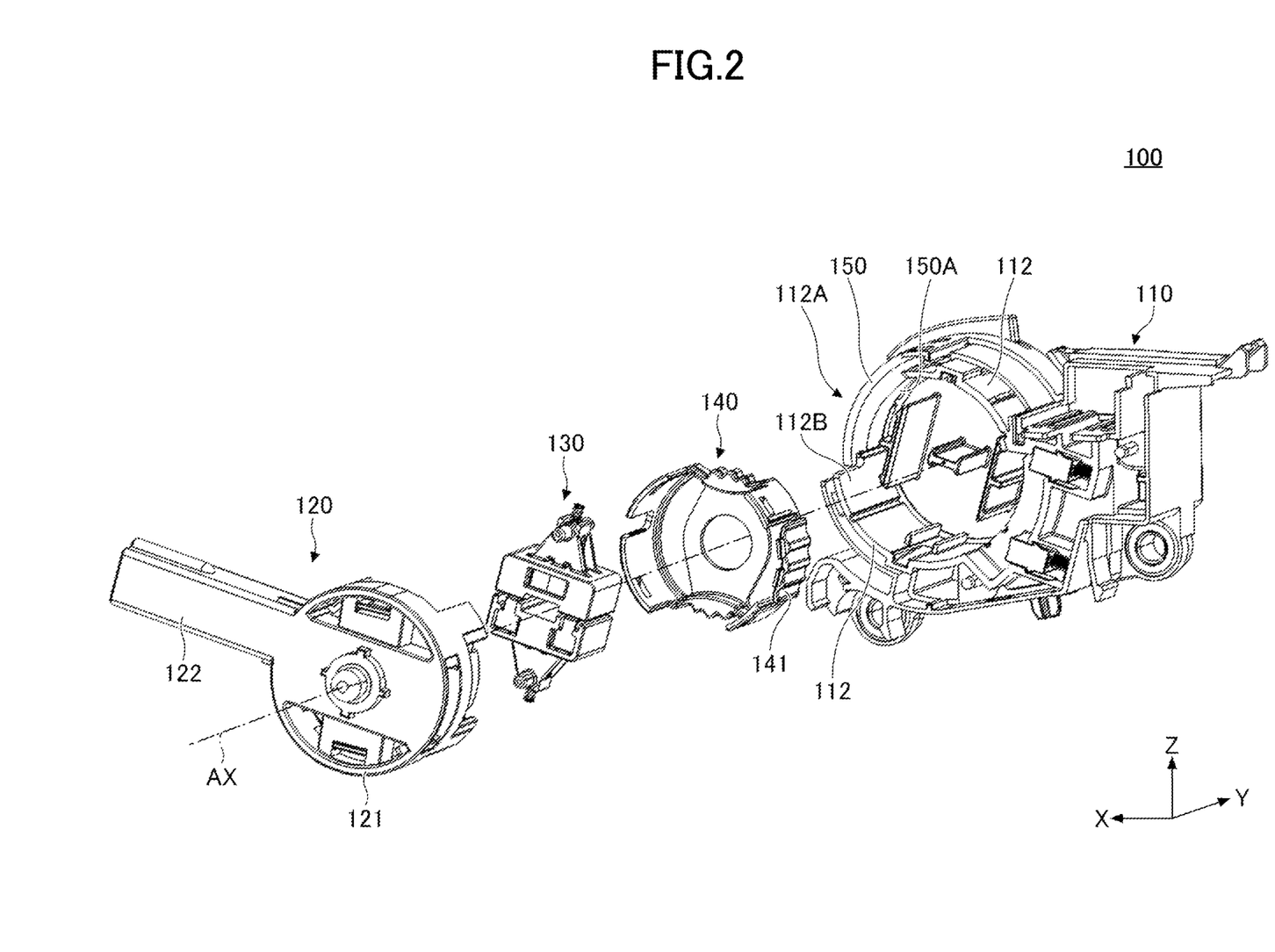
FIG. 2 is an exploded perspective view of the shift device according to the one embodiment.
Figure 3:
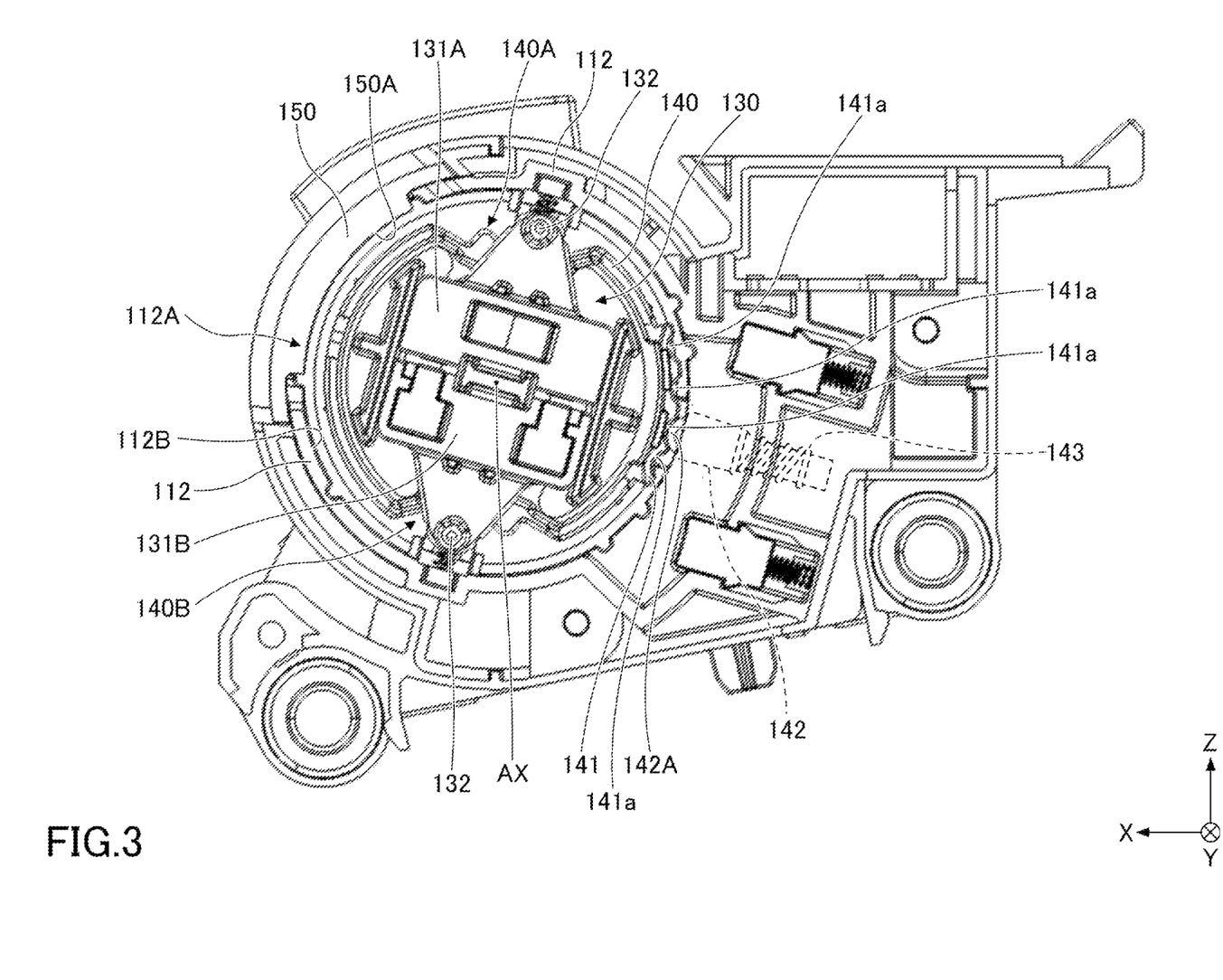
FIG. 3 is a side view of the shift device (in a state of a shift lever being removed) according to the one embodiment.

FIG. 2 is an exploded perspective view of a shift device 100 according to the one embodiment. FIG. 3 is a side view of the shift device 100 (in a state of the shift lever 120 being removed) according to the one embodiment. As illustrated in FIG. 2 and FIG. 3, the shift device 100 is provided with a click sensation imparting mechanism 130 and a cam member 140, inside the cylindrical portion 112 of the case 110.

The click sensation imparting mechanism 130 imparts a sensation of clicking in response to a rotation operation of the shift lever 120. The click sensation imparting mechanism 130 imparts a sensation of clicking to the driver through the shift lever 120 at a rotation angle corresponding to each of the shift positions.

Specifically, the click sensation imparting mechanism 130 has a pair of magnet holders 131A and 131B arranged to be opposite to each other having the rotation center axis interposed in-between. Each of the pair of magnet holders 131A and 131B holds a permanent magnet. Accordingly, a magnetic attraction force is generated between the pair of magnet holders 131A and 131B. Also, each of the pair of magnet holders 131A and 131B has a cylindrical pin 132 on the outermost side. The pins 132 slide along click portions 140A and 140B provided on a cam member 140 that rotate together with the shift lever 120. Each of the click portions 140A and 140B has four click grooves corresponding to the four shift positions.

The pair of magnet holders 131A and 131B move in a direction away from each other as the shift lever 120 and the cam member 140 rotate until each of the pins 132 reaches the top of click mountains of the click portion 140A or 140B. At this time, the pair of magnet holders 131A and 131B increase the rotational load on the cam member 140 and the shift lever 120, by resisting the magnetic attraction force acting between the magnet holders.

Then, after the shift lever 120 and the cam member 140 further rotate until each of the pins 132 reaches the top of a click mountain of the click portion 140A or 140B, the pair of magnet holders 131A and 131B move in a direction to be closer to each other. At this time, the pair of magnet holders 131A and 131B accelerate the rotation of the cam member 140 and the shift lever 120 by the magnetic attraction force acting the magnet holders.

Further, when the shift lever 120 and the cam member 140 rotate by a predetermined angle (a predetermined angle required for switching the shift position), and each of the pins 132 enters a click groove of the click portion 140A or 140B, the pair of magnet holders 131A and 131B stop the rotation of the cam member 140 and the shift lever 120. Accordingly, the pair of magnet holders 131A and 131B imparts a sensation of clicking to the driver through the shift lever 120 at a rotation angle corresponding to the shift position after switching.

In this way, the pair of magnet holders 131A and 131B imparts a sensation of clicking in response to a rotation operation of the shift lever 120, by changing the rotational load on the shift lever 120.

The cam member 140 is provided to partially contact the outer circumferential surface of the base portion 121 of the shift lever 120, and rotates together with the base portion 121. At this time, in the cam member 140, with respect to a cam portion 141 provided along the outer circumferential surface of the base portion 121, a tip 142*a* of the actuator 142 (see FIG. 3) provided to protrude from the inner circumferential surface 112B of the cylindrical portion 112 toward the cam portion 141, slides. Note that the actuator 142 is arranged on the bottom side (Y-axis positive side) of the case 110, and in FIG. 3, invisible portions other than the tip 142*a* are illustrated with broken lines. The cam portion 141 has four cam grooves 141*a* corresponding to the four shift positions. The actuator 142 is biased toward the rotation center axis AX by a coil spring 143 (see FIG. 3), and thereby, pressed against the cam portion 141. The actuator 142 can move forward and backward in the direction of the rotation center axis AX while expanding and contracting the coil spring 143 by sliding along the cam portion 141. Accordingly, each time the base portion 121 of the shift lever 120 rotates by a predetermined angle (an angle required for switching the shift position), the cam member 140 imparts a sensation of clicking to the rotational motion of the base portion 121, and by holding the tip 142*a* of the actuator 142 by the cam groove 141*a*, holds the base portion 121 of the shift lever 120 at a rotational angle corresponding to each of the multiple shift positions. Note that in the present embodiment, "a shift position holding mechanism configured to hold the shift lever at a predetermined shift position" is implemented with the cam portion 141, the actuator 142, and the coil spring 143.

Figure 4:
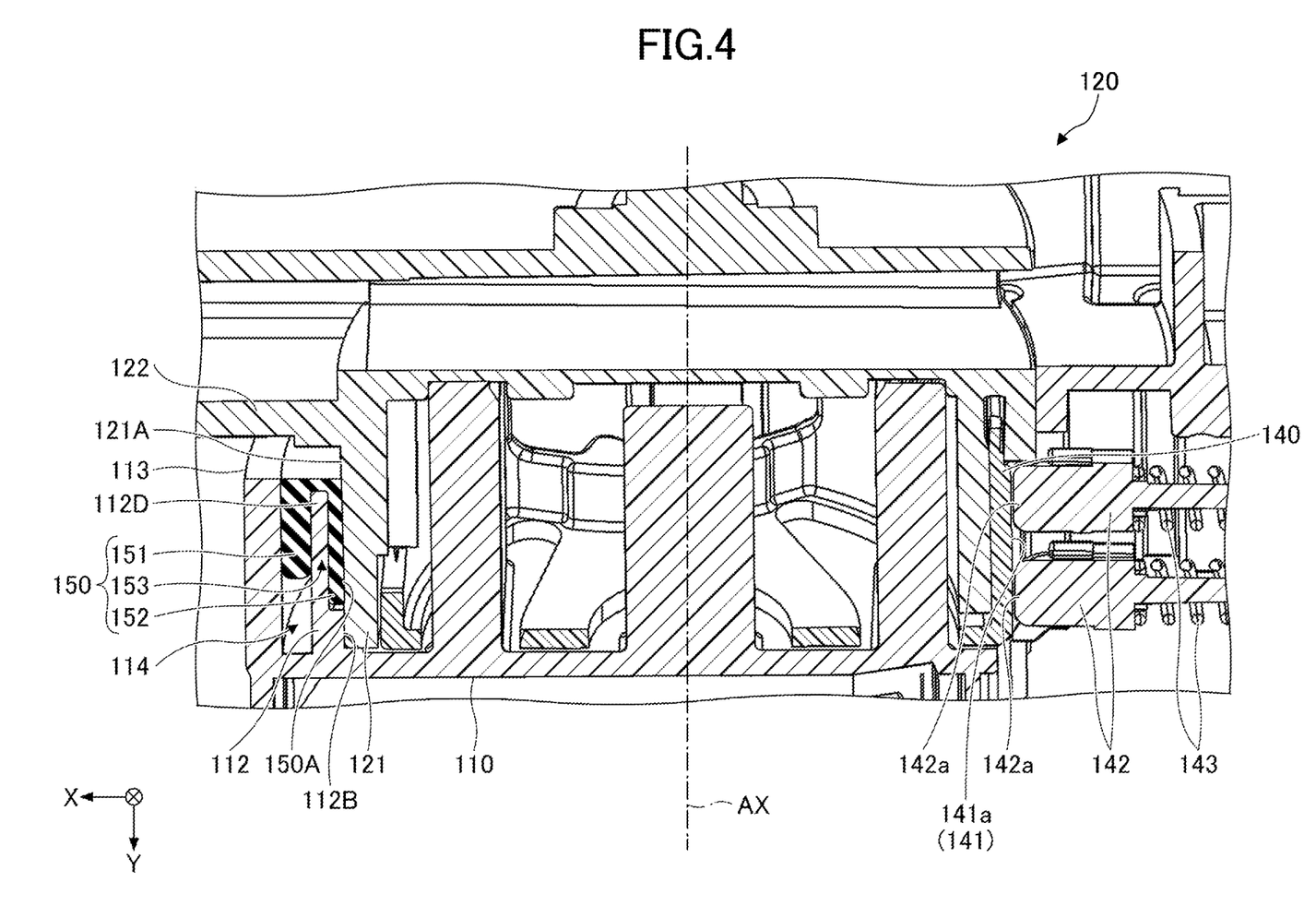
FIG. 4 is a partially enlarged cross-sectional view of the shift device according to the one embodiment.

FIG. 4 is a partially enlarged cross-sectional view of the shift device 100 according to the one embodiment. Note that in FIG. 4, illustration of part of the click sensation imparting mechanism 130 is omitted, for the sake of convenience, in order to intelligibly illustrate the positional relationship among the cylindrical portion 112 of the case 110, the base portion 121 of the shift lever 120, the cam portion 141 of the cam member 140, the actuator 142, and the elastic member 150 that will be described in FIG. 5 and thereafter.

As illustrated in FIG. 4, inside the cylindrical portion 112 of the case 110, the base portion 121 having a generally cylindrical shape of the shift lever 120 is arranged so as to be rotatable around the rotation center being the rotation center axis AX. Also, inside the cylindrical portion 112 of the case 110, the cam member 140 that rotates together with the base portion 121 of the shift lever 120 is provided.

As illustrated in FIG. 4, in the shift device 100, the actuator 142 and the elastic member 150 are provided at positions opposite to each other having the rotation center axis AX interposed in-between.

At the tip 142a, the actuator 142 provided on the rear side (X-axis negative side) relative to the rotation center axis AX causes the cam portion 141 formed on the outer circumferential surface of the cam member 140, to be biased toward the rotation center axis AX, by the biasing force from the coil spring 143.

Note that as illustrated in FIG. 4, the cam portion 141 has a fixed length in the Y-axis direction, and accordingly, the shift device 100 is provided with two sets of actuators 142 side by side in the Y-axis direction. In other words, at two points in the Y-axis direction, the cam portion 141 is biased in the direction of the rotation center axis AX, by uniform biasing forces applied from the two sets of actuators 142.

On the other hand, the elastic member 150 provided on the front side (the X-axis positive side) relative to the rotation center axis AX elastically deforms by the contact surface 150A protruding in the direction of the rotation center axis AX, contacting the outer circumferential surface 121A of the base portion 121 of the shift lever. Accordingly, the elastic member 150 generates a frictional force with the outer circumferential surface 121A, to impose a moderate load on a rotation operation of the shift lever 120.

(Elastic Member 150)

Figure 5:
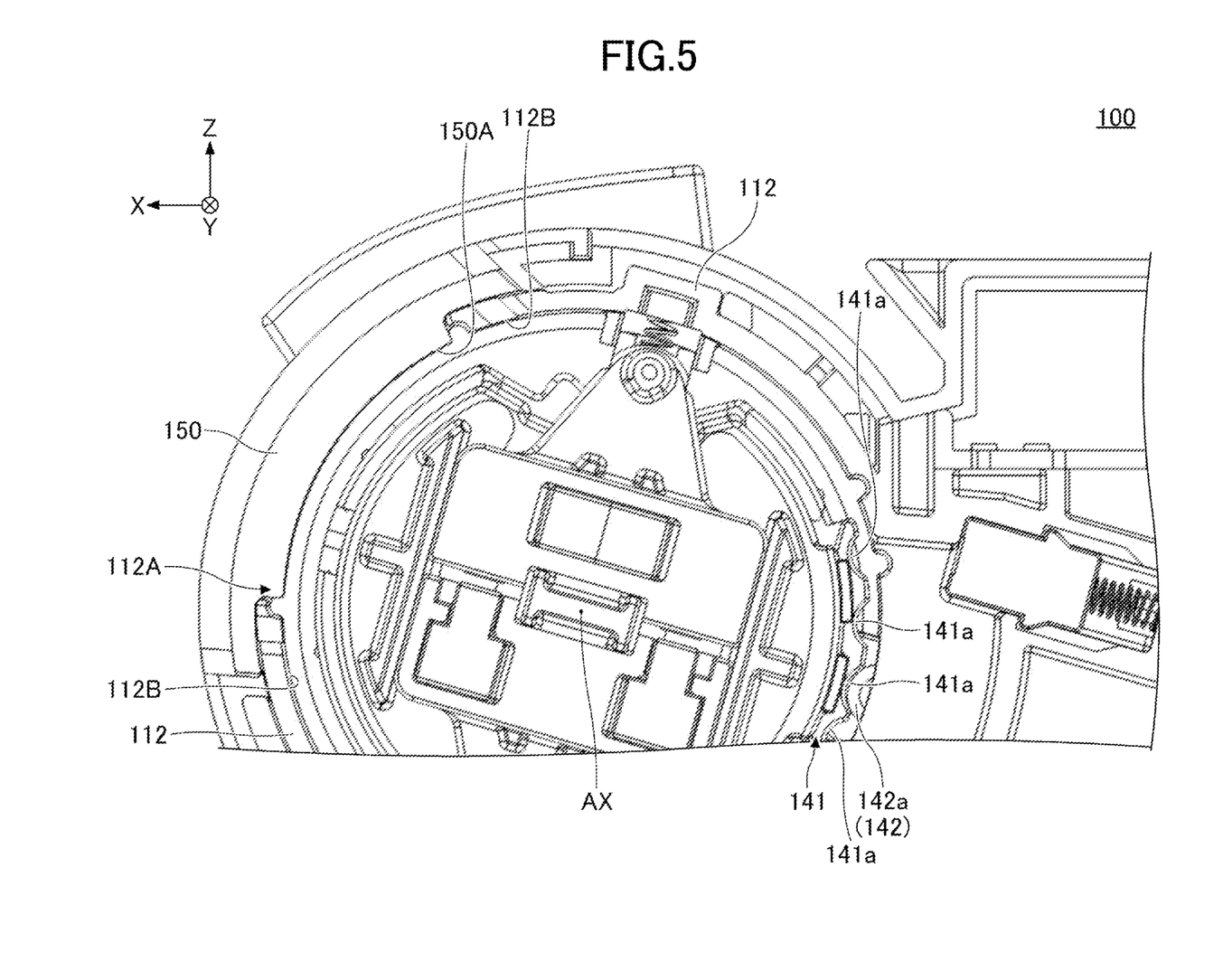
FIG. 5 is a partially enlarged view of the shift device illustrated in FIG. 3.

Here, with further reference to FIG. 5, the elastic member 150 provided in the shift device 100 will be described in detail. FIG. 5 is a partially enlarged view of the shift device 100 illustrated in FIG. 3. As illustrated in FIGS. 1 to 5, in the cylindrical portion 112 of the case 110, a notched portion 112A having a certain circumferential length and a certain depth is formed from an edge on the Y-axis negative side in the Y-axis positive direction. As illustrated in FIG. 1, in the notched portion 112A, the lever portion 122 of the shift lever 120 is arranged to be rotatable. Also, as illustrated in FIGS. 1 to 5, the elastic member 150 is provided at a deep bottom portion of the notched portion 112A (a portion on the Y-axis positive side).

The elastic member 150 is formed by using an elastic material such as rubber or silicone. The elastic member 150 has a contact portion 152 having the contact surface 150A that is curved along the inner circumferential surface 112B of the cylindrical portion 112, and faces the outer circumferential surface 121A of the base portion 121 of the shift lever 120. As illustrated in FIG. 4, the contact portion 152 elastically deforms in contact with the outer circumferential surface 121A of the base portion 121 of the shift lever 120 in a state of being held by the cylindrical portion 112, and generates a friction force with the outer circumferential surface 121A. Accordingly, the elastic member 150 can impose a moderate load on a rotation operation of the shift lever 120.

As a result, the shift device 100 according to the one embodiment can prevent the shift lever 120 from being rotated vigorously when a shift operation is performed by the driver. Therefore, the shift device 100 according to the one embodiment can prevent the shift lever 120 from overriding a shift position intended by the driver to enter the next shift position (i.e., prevent the tip 142a of the actuator 142 from entering a cam groove 141a corresponding to the next shift position).

Note that the contact surface 150A of the elastic member 150 protrudes slightly toward the rotation center axis AX compared to the inner circumferential surface 112B of the cylindrical portion 112. In other words, the contact surface 150A of the elastic member 150 has a radius from the AX that is slightly smaller than that of the inner circumferential surface 112B of the cylindrical portion 112. For example, the amount of protrusion of the contact portion 152 in the direction of the rotation center axis AX is approximately 0.05 to 0.10 mm. However, the amount is not limited as such, and an appropriate amount of protrusion may be set according to the clearance between the inner circumferential surface 112B of the cylindrical portion 112 and the outer circumferential surface 121A of the base portion 121 of the shift lever 120. Accordingly, the shift device 100 according to the one embodiment can have the outer circumferential surface 121A of the base portion 121 of the shift lever 120 come into contact with the contact surface 150A of the elastic member 150 before coming into contact with the inner circumferential surface 112B of the cylindrical portion 112. Therefore, the shift device 100 according to the one embodiment can more securely impose a load on a rotation operation of the shift lever 120.

Further, when the contact portion 152 of the elastic member 150 is slightly flattened by the outer circumferential surface 121A of the base portion 121 of the shift lever 120, the shift device 100 according to the one embodiment can have the outer circumferential surface 121A come into contact with the inner circumferential surface 112B of the cylindrical portion 112. For example, in the case where the amount of protrusion of the contact portion 152 in the direction of the rotation center axis AX is 0.10 mm, when the contact portion 152 is flattened by 0.10 mm, it is possible to have the outer circumferential surface 121A of the base portion 121 of the shift lever 120 come into contact with the inner circumferential surface 112B of the cylindrical portion 112 that is formed of a material (PBT) harder than the elastic member 150. Accordingly, the contact portion 152 can be prevented from being flattened by 0.10 mm or greater. In other words, the shift device 100 according to the one embodiment can cause the inner circumferential surface 112B of the cylindrical portion 112 to function as "a restricting surface to restrict elastic deformation of the elastic member", and thereby, the contact surface 150A of the elastic member 150 can be suppressed from being flattened excessively. As a result, the shift device 100 according to the one embodiment can suppress damage and deterioration of the elastic member 150. Note that the cylindrical portion 112 may further have another restricting surface at a position radically different from that of the inner circumferential surface 112B.

Also, as illustrated in detail in FIG. 4, the shift device 100 according to the one embodiment has the elastic member 150 provided at a position opposite to the actuator 142 (an example of a "biasing means") having the rotation center axis AX interposed in-between. Therefore, the shift device 100 according to the one embodiment can move the base portion 121 of the shift lever 120 close to the elastic member 150 side by the amount of looseness in the radial direction generated in the base portion 121 of the shift lever 120 due to the biasing force from the actuator 142 in the direction of the center of rotation axis AX, i. e., can cause the outer circumferential surface 121A of the base portion 121 of the shift lever 120 to securely press against the contact surface 150A of the elastic member 150; and even in this case, the amount of push of the elastic member 150 by the outer circumferential surface 121A can be restricted, by having the outer circumferential surface 121A contact the inner circumferential surface 112B of the cylindrical portion 112 as the restricting surface. Therefore, the shift device 100 according to the one embodiment can cause the outer circumferential surface 121A of the base portion 121 of the shift lever 120 to transition into a state of being pressed against the contact surface 150A of the elastic member 150 all the time in a certain direction with a constant pressing force by the biasing force from the actuator 142, and can suppress the fluctuation of the rotational load on the shift lever 120 compared with the case of being simply contact with it.

(Specific Configuration of the Elastic Member 150)

Figure 6:
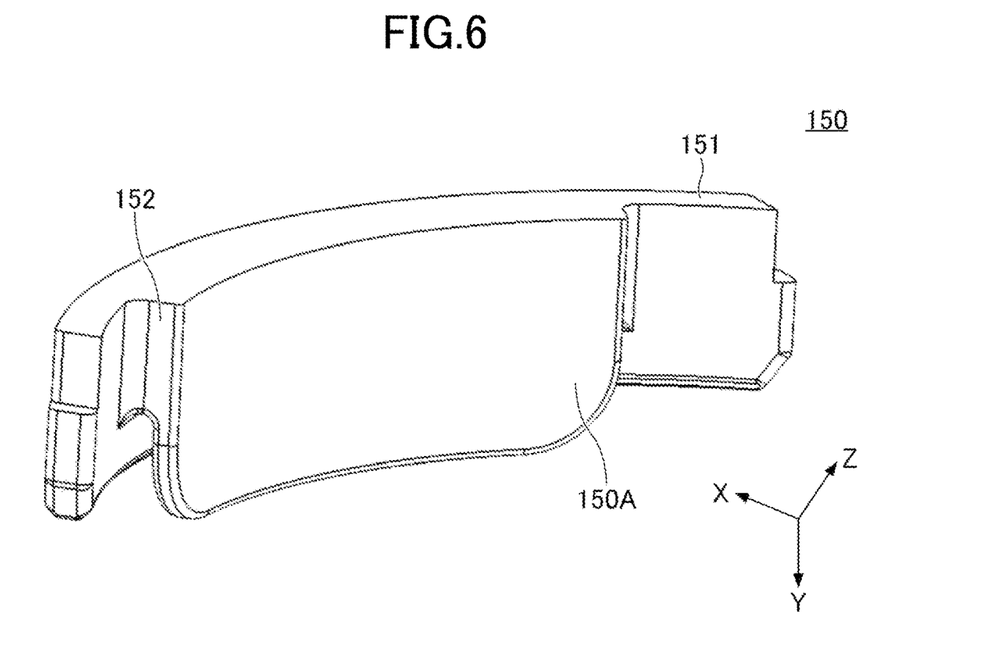
FIG. 6 is an external perspective view of an elastic member provided in the shift device according to the one embodiment, as viewed from the top side.
Figure 7:
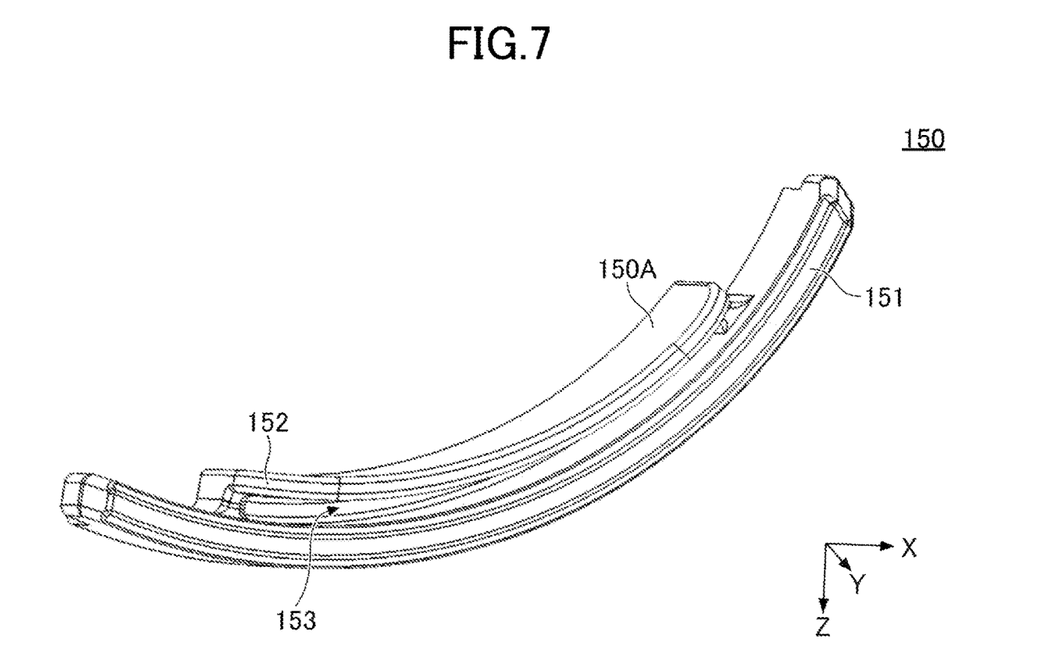
FIG. 7 is an external perspective view of an elastic member provided in the shift device according to the one embodiment, as viewed from the bottom side.

FIG. 6 is an external perspective view of the elastic member 150 provided in the shift device 100 according to the one embodiment, as viewed from the top side (the Y-axis negative side when attached to the case 110). FIG. 7 is an external perspective view of the elastic member 150 provided in the shift device 100 according to the one embodiment, as viewed from the bottom side (the Y-axis positive side when attached to the case 110).

As illustrated in FIGS. 6 and 7, the elastic member 150 has a holding portion 151 and a contact portion 152. The holding portion 151 is a curved plate-shaped portion that is curved along an outer circumferential surface 112C (see FIG. 8) of the cylindrical portion 112, and has a constant thickness.

The contact portion 152 is a curved plate-like portion having a constant thickness, that is provided at a position protruding inward (toward the rotation center axis AX) from the inner circumferential surface of the holding portion 151. The contact portion 152 has a fixed length in the circumferential direction of the holding portion 151. For example, in the present embodiment, the circumferential length of the contact portion 152 is set to a length that corresponds to 45 degrees of the base portion 121 of the shift lever 120. Note that the circumferential length of the contact portion 152 is shorter than the circumferential length of the holding portion 151. In other words, the holding portion 151 extends by a predetermined length further in the circumferential direction from each of both ends of the contact portion 152 in the circumferential direction. Accordingly, the size of the elastic member 150 can be reduced, compared with the case where the elastic member 150 is annularly formed over the entire circumference.

The inner circumferential surface of the contact portion 152 is the contact surface 150A of the elastic member 150 that contacts the outer circumferential surface 121A of the base portion 121 of the shift lever 120, as previously described. The thickness of the contact portion 152 is suitably set to a dimension that allows it to protrude slightly toward the rotation center axis AX relative to the inner circumferential surface 112B of the cylindrical portion 112, to have the contact surface 150A come into contact with the outer circumferential surface 121A of the base portion 121 of the shift lever 120.

Also, as illustrated in FIG. 6, the elastic member 150 has a groove 153 having its bottom side opened, between the holding portion 151 and the contact portion 152. The groove 153 is curved along the rib 112D (see FIGS. 4 and 8) provided on the peripheral wall portion of the case 110. The rib 112D is inserted into the groove 153 to fit and hold the elastic member 150 when it is attached to the case 110.

(Configuration of Mounting Portion of the Elastic Member 150)

Figure 8:
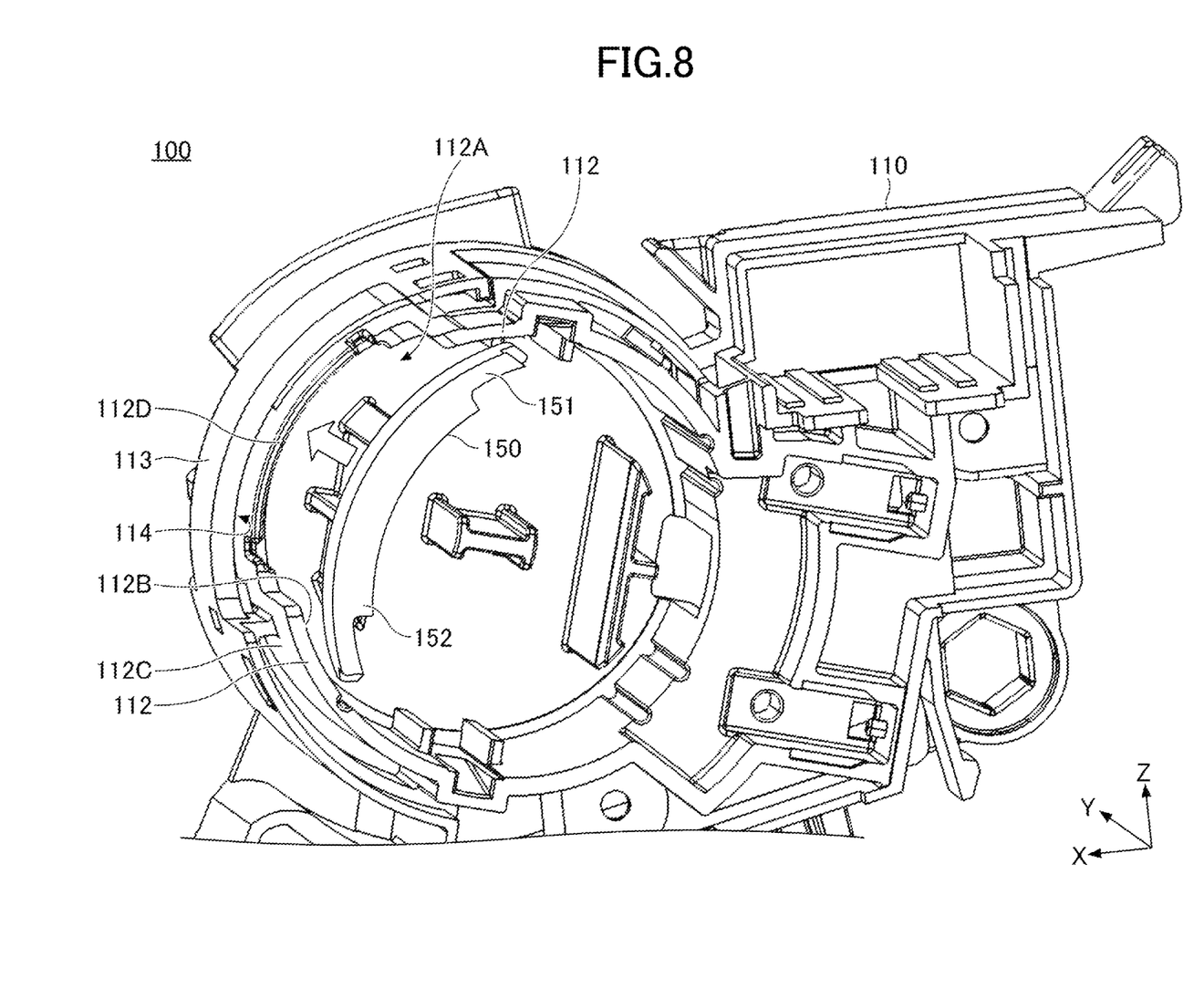
FIG. 8 is an enlarged perspective view of a mounting portion of the elastic member in the shift device according to the one embodiment.

FIG. 8 is an enlarged perspective view of a mounting portion of the elastic member 150 in the shift device 100 according to the one embodiment.

As illustrated in FIG. 8, in the cylindrical portion 112 of the case 110, a notched portion 112A having a certain circumferential length and a certain depth (a distance in the Y-axis direction) is formed in the right direction the Y-axis positive direction from an edge on the left side (the Y-axis negative side). The notched portion 112A allows the lever portion 122 of the shift lever 120 to protrude outward from the cylindrical portion 112, and forms a region where the lever portion 122 rotates. Therefore, the length in the circumferential direction of the notched portion 112A is set at least longer than the rotatable length in the circumferential direction of the lever portion 122. Also, the depth of the notched portion 112A is set at least greater than that of the lever portion 122.

Also, at the deep bottom portion of the notched portion 112A in the cylindrical portion 112 (a portion on the Y-axis positive side), the rib 112D is formed to protrude toward the notched portion 112A (the Y-axis negative side), and to be curved with a certain length along the circumferential wall of the cylindrical portion 112.

Also, the case 110 has an outer wall 113 curved along the cylindrical portion 112 outside the cylindrical portion 112. Further, in the case 110, a gap 114 curved with a fixed width is formed between the notched portion 112A and the outer wall 113.

As illustrated in FIG. 8, the elastic member 150 is attached by being inserted from the left side (Y-axis negative side) toward the deep bottom portion of the notched portion 112A in the cylindrical portion 112. At this time, as illustrated in FIG. 4, the holding portion 151 of the elastic member 150 is fitted into the gap 114 having substantially the same shape as the holding portion 151, and thereby, the elastic member 150 can be accurately positioned and secured at a predetermined position. Also, by having the rib 112D, which has substantially the same shape as the groove 153, inserted and fitted into the groove 153 (see FIG. 7) of the elastic member 150, the elastic member 150 is accurately positioned and fixed at the predetermined position.

Note that by being inserted into the groove 153 of the elastic member 150, the rib 112D functions as a core material of the elastic member 150, and can receive the reaction force during elastic deformation of the elastic member 150.

Also, the holding portion 151 of the elastic member 150 that becomes longer in the circumferential direction than the contact portion 152, and comes into contact with the outer circumferential surface 112C of the cylindrical portion 112, can restrict movement of the elastic member 150 in the rotation direction and in the direction of the rotation center axis AX. In other words, the holding portion 151 can maintain the position of the contact portion 152 in the rotation direction and the amount of protrusion in the direction of the rotation center axis AX to appropriate levels.

As above, the one embodiment of the present invention has been described in detail; note that the present invention is not limited to the embodiment or the like, and various variations or modified examples can be made within the scope of the subject matters of the present invention as set forth in the claims.

For example, the elastic member 150 may be provided on the shift lever 120 instead of on the case 110. In other words, the elastic member 150 may be provided on the outer circumferential surface 121A of the base portion 121 of the shift lever 120, so as to have its contact surface 150A contact the inner circumferential surface 112B of the cylindrical portion 112 of the case 110.

For example, the shift lever 120 and the cam member 140 may be formed as an integrated part rather than separate parts. In other words, in the present embodiment, individual parts formed to be separated from each other from the viewpoint of ease of manufacturing, may be formed as an integrated part as appropriate.

What is claimed is:

1. A shift device comprising:
a case having a cylindrical portion;
a shift lever configured to include a base portion provided to be rotatable inside the cylindrical portion, with which an operator performs a rotation operation;
a shift position holding mechanism configured to hold the shift lever at a predetermined shift position; and
an elastic member configured to protrude from one of the cylindrical portion or the base portion so as to face another of the cylindrical portion or the base portion, and contact either an outer circumferential surface of the base portion or an inner circumferential surface of the cylindrical portion, to impose a rotational load on the shift lever.

2. The shift device as claimed in claim 1, wherein the elastic member is held by the cylindrical portion, and includes a contact portion that protrudes toward a rotation center axis of the shift lever, and contacts the outer circumferential surface of the base portion.

3. The shift device as claimed in claim 2, wherein the cylindrical portion includes a restricting surface that is harder than the elastic member, to restrict elastic deformation of the elastic member.

4. The shift device as claimed in claim 1, wherein the shift position holding mechanism includes a biasing means configured to bias a cam portion provided along the outer circumferential surface of the base portion toward a rotation center axis of the shift lever, and
wherein the elastic member is provided at a position facing the biasing means having the rotation center axis in-between.

5. The shift device as claimed in claim 4, wherein the biasing means is an actuator configured to hold the shift lever by a cam groove of the cam portion provided at a rotation angle corresponding to each of multiple shift positions.

* * * * *